April 6, 1943. W. L. DE BAUFRE 2,316,056
METHOD AND APPARATUS FOR RECTIFYING FLUID MIXTURES
Filed Aug. 26, 1939 2 Sheets-Sheet 1

Wm. L. De Baufre
INVENTOR

April 6, 1943.  W. L. DE BAUFRE  2,316,056
METHOD AND APPARATUS FOR RECTIFYING FLUID MIXTURES
Filed Aug. 26, 1939  2 Sheets—Sheet 2

Wm. L. De Baufre
INVENTOR

Patented Apr. 6, 1943

2,316,056

UNITED STATES PATENT OFFICE 2,316,056

METHOD AND APPARATUS FOR RECTIFYING FLUID MIXTURES

William Lane De Baufre, Lincoln, Nebr.

Application August 26, 1939, Serial No. 292,081

17 Claims. (Cl. 62—175.5)

This invention relates to the separation of fluid mixtures by rectification where more than two products are desired in a more or less pure state. It is particularly applicable to the separation of atmospheric air into three products, namely, nearly pure oxygen, nearly pure nitrogen and an argon-rich gas.

Atmospheric air is usually rectified into two products to obtain high purity oxygen. When rectified into two products only, the yield of high purity oxygen is low because a large portion of the oxygen must be driven off with the argon in order to obtain high purity oxygen. But by rectifying the air into three products by the method and apparatus of the present invention, high purity oxygen can be obtained with a higher yield than customary. Argon of commercial purity can also be obtained.

One of the objects of the present invention is to provide the necessary refluxes of liquid and vapor to separate by rectification fluid mixtures into three or more products.

Another object of the invention is to provide these refluxes largely by heat exchange between different parts of the system rather than by heating or cooling from an external source. Little more heating and cooling from external sources are thus required to separate a fluid mixture into three or more products than would be required to separate it into two products only. This is particularly valuable in air separation plants which operate at very low temperatures where the heating and cooling for rectification must be accomplished internally to the system.

A further object of the invention is to make the apparatus automatically adjustable to fluid mixtures of variable composition. A larger or smaller quantity of any one product, such as argon from atmospheric air, may then be withdrawn as desired.

These objects and such other advantages as are inherent in the invention, are realized by the method and apparatus shown in preferred forms in the accompanying drawings, wherein.

The invention will first be described for separating atmospheric air into three products, more or less pure nitrogen, oxygen and argon, by referring to Figure 1 and then to Figure 2. The application of the invention for separating a fluid mixture into more than three products will be described by referring to Figure 3 and then to Figure 4.

Figure 1:
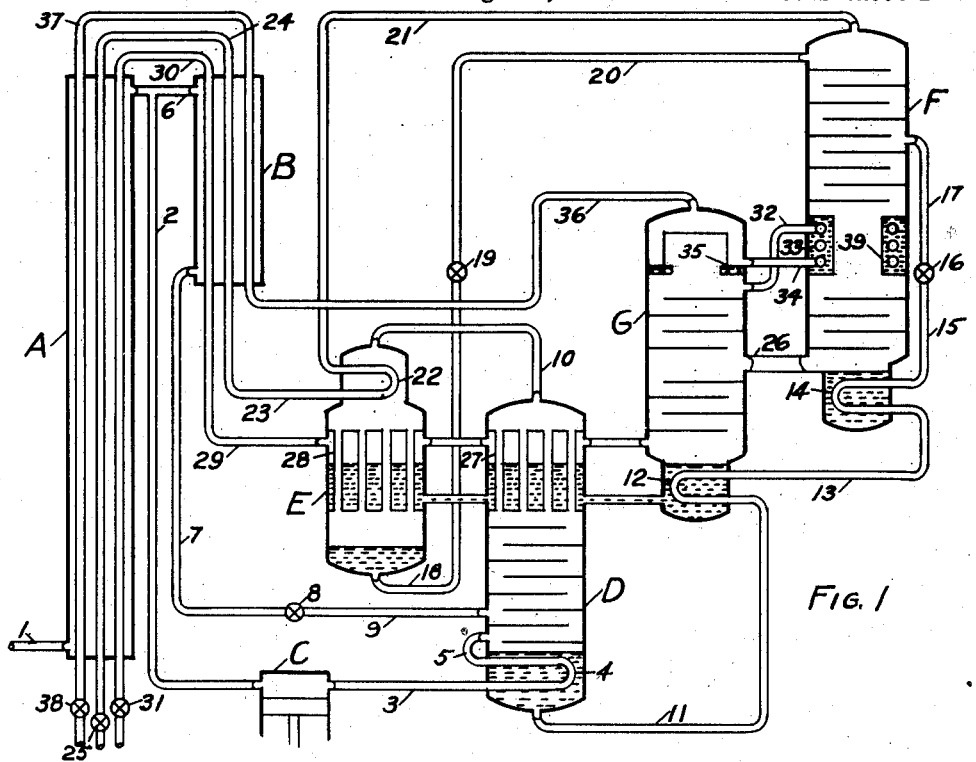
Figure 1 shows the invention applied to the separation of atmospheric air into three products, namely, nearly pure oxygen, nearly pure nitrogen, and an argon-rich gas.

Referring to Figure 1, compressed atmospheric air freed of carbon dioxide and possibly water vapor, is supplied through pipe 1 to interchanger A where the compressed air is cooled by heat exchange with returning products of rectification. Part of the cooled compressed air flows through pipe 2 to expansion engine C where heat is removed from the compressed air by performance of mechanical work. The expanded air flows through pipe 3 to coil 4 where the expanded air is further cooled before being discharged through pipe 5 into preliminary rectifier D. The remaining cooled compressed air flows through pipe 6 into liquefier B and is more or less liquefied by heat exchange with returning products of rectification. The liquefied air flows through pipe 7 to valve 8 where the pressure is reduced by throttling. The throttled air is discharged through pipe 9 into preliminary rectifier D.

Within preliminary rectifier D, the expanded and throttled atmospheric air is rectified into nearly pure nitrogen vapor which leaves through pipe 10 and an oxygen-rich liquid which accumulates around coil 4. This oxygen-rich liquid flows through pipe 11, coil 12, pipe 13, coil 14, and pipe 15 to valve 16 where the oxygen-rich liquid is throttled to a lower pressure. The throttled oxygen-rich liquid is discharged through pipe 17 into main rectifier F.

The nearly pure nitrogen vapor leaving preliminary rectifier D through pipe 10 is liquefied within exchanger E. The resulting nearly pure nitrogen liquid flows through pipe 18 to valve 19 where the pressure is reduced by throttling. The throttled nitrogen liquid is discharged through pipe 20 into the top of main rectifier F.

Within main rectifier F, the oxygen-rich liquid is rectified into nearly pure nitrogen vapor, which leaves through pipe 21, and an impure oxygen liquid containing mainly argon as an impurity, which accumulates around coil 14. The nearly pure nitrogen vapor is withdrawn through coil 22, pipe 23, liquefier B, pipe 24, interchanger A and valve 25 as the nitrogen product of rectification.

The impure liquid oxygen flows through pipe 26 into auxiliary rectifier G where it is further rectified into a liquid of nearly pure oxygen and a vapor rich in argon. The nearly pure oxygen liquid accumulates around coil 12 and also around tubes 27 and 28 within preliminary rectifier D and exchanger E respectively. This liquid is vaporized to produce vapor reflux of nearly pure oxygen. Part of the nearly pure oxygen vapor is withdrawn through pipe 29, liquefier B, pipe 30, interchanger A and valve 31 as the oxygen product of rectification.

The argon-rich vapor flows through pipe 32 to coil 33 where part of it is condensed. The liquid and vapor mixture returns from the heat transfer means through pipe 34 to a separator in the top of auxiliary rectifier G. The separated liquid flows through liquid seal 35 to form liquid reflux in auxiliary rectifier G. The argon-rich vapor is withdrawn through pipe 36, liquefier B, pipe 37, interchanger A and valve 38 as the argon product of rectification.

Coil 33 is mounted within vessel 39 arranged to catch impure oxygen liquid flowing down from tray to tray within main rectifier F. Some of the impure oxygen liquid in vessel 39 is vaporized to partly condense the argon-rich vapor flowing through coil 33.

Figure 2:
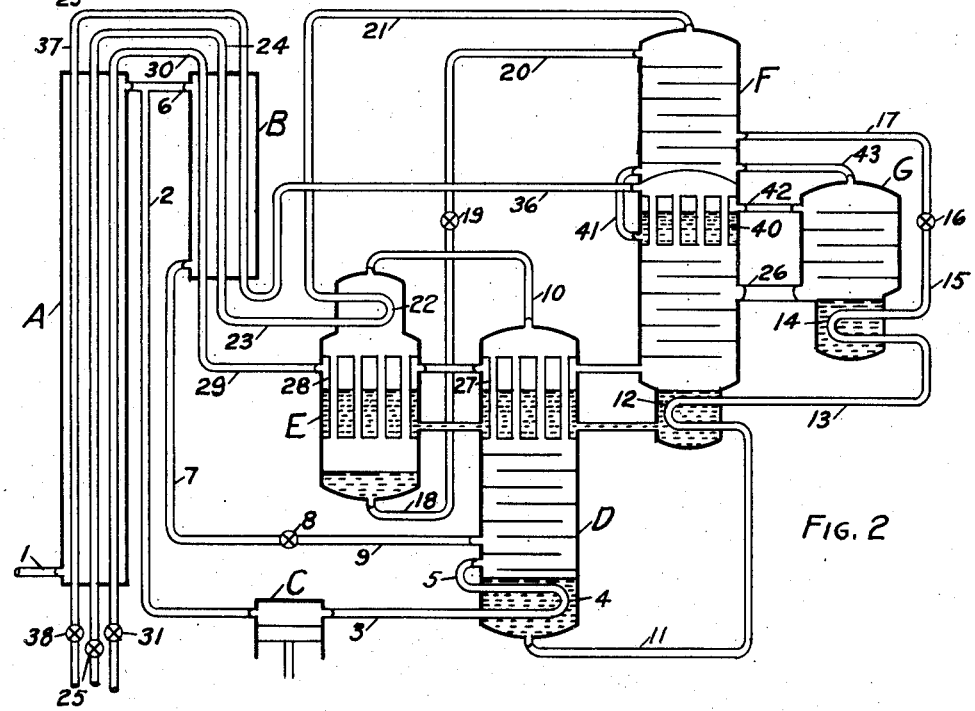
Figure 2 shows a modified form of the rectifying apparatus for separating atmospheric air into three products.

The apparatus in Figure 2 is the same as in Figure 1 except that the main and auxiliary rectifiers are differently arranged. In Figure 1, the main rectifier is one column F while the auxiliary rectifier is a separate column G connected by piping to column F. In Figure 2, part of the main rectifier and all of the auxiliary rectifier are contained within column F while the auxiliary column G contains a part only of the main rectifier between the heat transfer means and outlet 26 for impure oxygen.

The heat exchanger to produce liquid reflux in auxiliary rectifier G of Figure 2 is arranged differently from the heat exchanger in Figure 1. In Figure 2, the argon-rich vapor product of the auxiliary rectification flows up through tubes 40 where the vapor is partly condensed to form a liquid reflux for the auxiliary rectification, the remaining vapor being withdrawn through pipe 36, liquefier B, pipe 37, interchanger A and valve 38 as the argon product of rectification. The impure oxygen liquid flowing down from tray to tray within the main rectifier flows through pipe 41 into the space around tubes 40 where the impure oxygen liquid is partly vaporized by heat exchange with the argon-rich vapor. The remaining impure oxygen liquid and vapor flow through pipe 42 to auxiliary column G where the impure oxygen liquid flows down from tray to tray while the impure oxygen vapor returns through pipe 43 to main column F commingled with vapor rising through the trays in auxiliary column G. The main rectification of the impure oxygen liquid continues within auxiliary column G until the impure oxygen liquid flows through pipe 26 to complete its rectification within the auxiliary rectifier in main column F.

In both Figure 1 and Figure 2, liquid reflux for the main rectification is the nitrogen liquid supplied through pipe 20 from exchanger E. This liquid reflux is augmented by warming the nitrogen product of rectification as it flows through coil 22 in exchanger E. This feature is claimed in application Serial No. 108,913, filed Nov. 2, 1936 now Patent No. 2,240,925 granted May 16, 1941.

Vapor reflux for both the main rectification and the auxiliary rectification is produced by vaporization of the nearly pure oxygen liquid product of the auxiliary rectification around tubes 27 and 28. The vapor thus produced first serves as vapor reflux in the auxiliary rectification. Part of it then flows through pipe 26 to serve as vapor reflux in the main rectification. Liquid reflux for the preliminary rectification is produced by condensation within tubes 27 of the nearly pure nitrogen vapor component of the preliminary rectification. Liquid reflux for the preliminary rectification and vapor reflux for the auxiliary and main rectifications are thus produced by heat exchange between vapor from the preliminary rectification and the liquid product of the auxiliary rectification.

Figure 4:
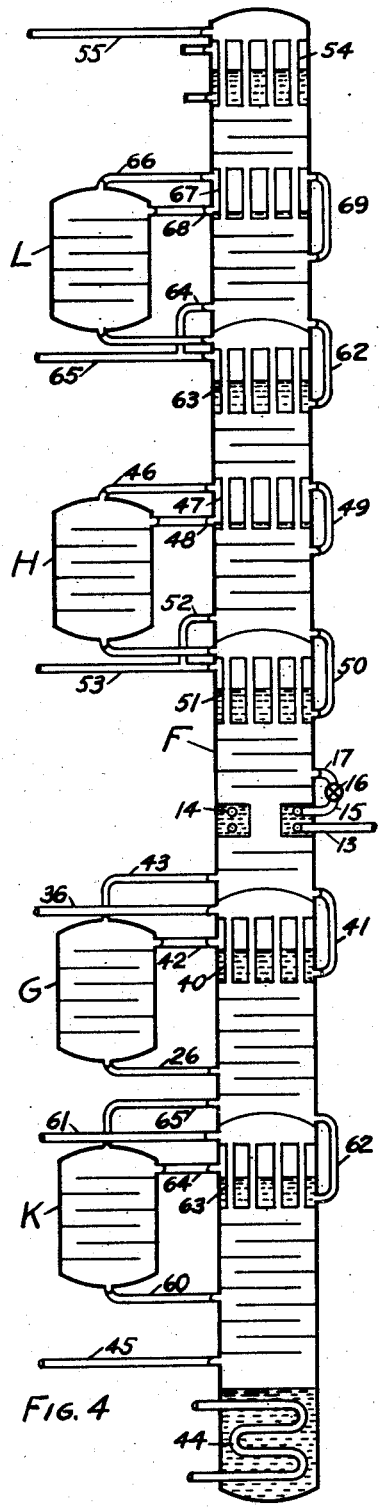
Figure 4 shows a modified form of the rectifying apparatus for separating a fluid mixture into six products.

Vapor refluxes in the auxiliary and main rectifications are augmented by heat exchange between the pure and the impure oxygen liquids therefrom and the oxygen-rich liquid flowing through coils 12 and 14 respectively before the oxygen-rich liquid is subjected to rectification. For reasons to be discussed later, it is more effective to augment vapor reflux near the inlet of the main rectifier than at any other place. Also, the nearer the cooling coil for the oxygen-rich liquid is located to the inlet of the main rectifier, the greater will the vapor reflux at the inlet be augmented by reason of the lower temperature of the impure oxygen liquid in which the cooling coil is immersed. The impure oxygen liquid will then be cooled to a lower temperature with more heat abstracted therefrom and more impure oxygen liquid vaporized to augment the vapor reflux between the cooling coil and the inlet to the rectifier. In Figure 4, coil 14 is shown immersed in impure oxygen liquid within a few trays of the inlet from pipe 17. Coil 14 or an additional coil could be immersed in the impure oxygen liquid within vessel 39 in Figure 1. Coil 14 immersed in impure oxygen liquid within the main rectifier is more effective in increasing the vapor reflux near the inlet to the main rectifier than coil 12 immersed in the nearly pure oxygen liquid from the auxiliary rectifier. Coil 12 in series with coil 14 is most effective, however, because vapor reflux in the auxiliary rectifier is augmented as well as vapor reflux in the main rectifier.

In the rectification of atmospheric air, only the liquid component of the main rectification is further rectified into oxygen and argon. The vapor component of the main rectification is nearly pure nitrogen. If the neon in atmospheric air were sufficient in quantity, it might be separated from the nitrogen by an auxiliary rectification of the vapor component in the apparatus shown in Figure 3. The apparatus in Figure 3 can be used for the separation of a fluid mixture of four hydrocarbons.

Figure 3:
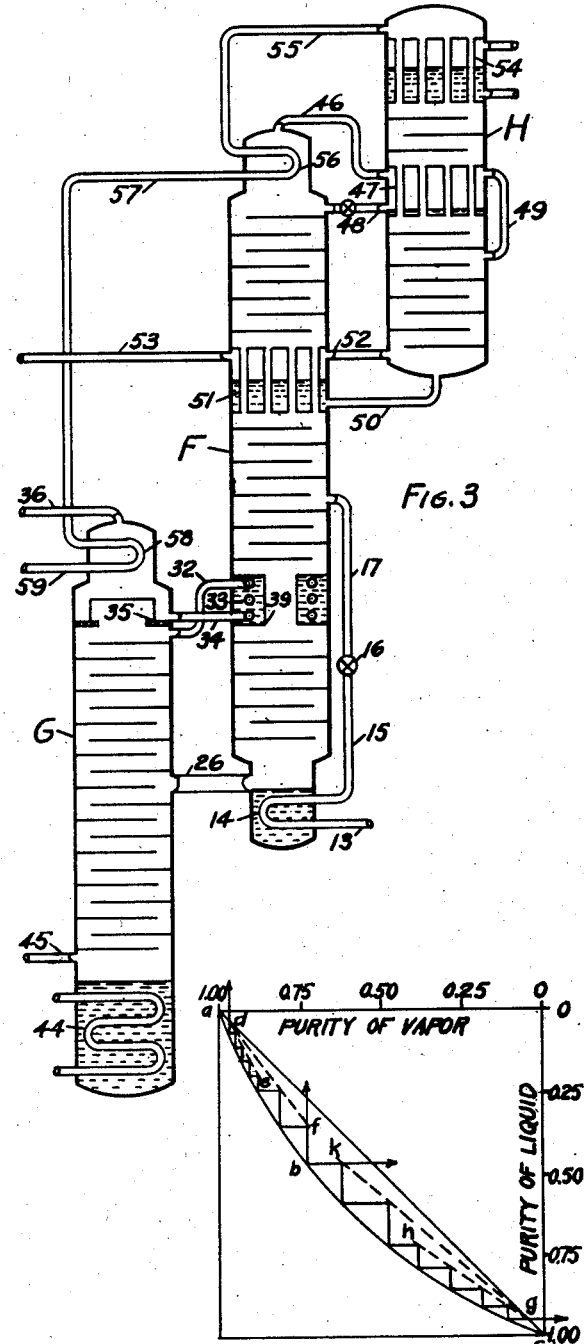
Figure 3 shows the invention applied to the separation of a fluid mixture into four products.

Referring to Figure 3, the fluid mixture to be rectified into four products, after passing through interchangers, etc., not shown, flows through pipe 13, coil 14, pipe 15, valve 16 and pipe 17 into main rectifier F. Within main rectifier F, the fluid mixture is rectified into a vapor component and a liquid component.

The liquid component accumulates around coil 14 and flows through pipe 26 into auxiliary rectifier G, where the liquid component is rectified into a vapor product and a liquid product.

The vapor product leaves through pipe 36 after passing through coil 33 where it is partly condensed by heat exchange with liquid undergoing the main rectification to form liquid reflux for the auxiliary rectification. The liquid product accumulates around coil 44 where it is vaporized. Part of the resulting vapor forms vapor reflux for the auxiliary and main rectifications. The remaining vapor is withdrawn through pipe 45 as one of the products of rectification.

The vapor component of the main rectification flows through pipe 46 to the space surrounding tubes 47 where the vapor is partly condensed by heat exchange with liquid undergoing rectification in auxiliary rectifier H. The condensed vapor returns through pipe 48 to form liquid reflux in the main rectification. The remaining vapor enters auxiliary rectifier H through pipe 49. This pipe is shown with the inlet to the auxiliary rectifier below tubes 47. The inlet would be above tubes 47 except where temperature conditions require it to be below tubes 47 as shown. Within auxiliary rectifier H, the vapor component is rectified into a vapor product and a liquid product. The liquid product flows through pipe 50 to the space surrounding tubes 51 where the liquid is vaporized. Part of the vapor returns through pipe 52 to form vapor reflux in the auxiliary rectification. The remaining vapor is withdrawn through pipe 53 as one of the products of rectification. The vapor product of the auxiliary rectification flows through tubes 54 where it is partly condensed to form liquid reflux in the auxiliary rectification. The remaining vapor is withdrawn through pipe 55, coil 56, pipe 57, coil 58 and pipe 59 as one of the products of rectification.

In Figure 3, refluxes for rectification are produced by a heating fluid flowing through coil 44 and a cooling fluid around tubes 54. The same liquid might be used for both heating and cooling by compressing it to a pressure at which it will condense in coil 44 and then throttling it to a pressure at which it will vaporize around tubes 54. The fluid may then be recirculated. The liquid refluxes are augmented by warming the most volatile products of rectification as this product flows through coils 56 and 58. The vapor refluxes are augmented by cooling the fluid to be rectified as it flows through coil 14.

It may be noted that while only one heat exchanger is employed in connection with the auxiliary rectification of the liquid component of the main rectification, two heat exchangers are used in connection with the auxiliary rectification of the vapor component of the main rectification. In both cases, reflux is produced for the auxiliary rectification by heat exchange between a product of the auxiliary rectification and the fluid undergoing rectification in the main rectification. In the auxiliary rectification of the vapor component, however, an additional heat exchanger is employed between the vapor component of the main rectification and the fluids undergoing the auxiliary rectification. This heat exchanger is used in order to regulate the reflux liquid in the main rectification, which may be accomplished by a valve or orifice in pipe 48 or simply by proportioning the heating surface in tubes 47. Otherwise, it would be difficult to withdraw from the down-flowing liquid in auxiliary rectifier H a proper portion as liquid reflux for main rectifier F. Such a heat exchanger might be used in connection with the auxiliary rectification of the liquid component of the main rectification; but this is unnecessary because the rising vapor in auxiliary rectifier G will readily divide into two streams—one flowing through the upper part of auxiliary rectifier G while the other stream flows through pipe 26 to main rectifier F.

Coiled tube 33 in vessel 39 is an alternate scheme to tube exchanger 47. In either case, vapor is partly condensed by heat exchange with a liquid undergoing rectification.

Figure 3 shows the apparatus of Figure 1 applied to the rectification of a fluid mixture into four products. Figure 4 shows the apparatus of Figure 2 applied to the rectification of a fluid mixture into six products. Referring to Figure 4, the fluid mixture to be rectified into six products enters the long column F through pipe 13, coil 14, pipe 15, valve 16 and pipe 17. Within the middle portion of main column F and in auxiliary columns G and H, the fluid mixture is subjected to a main rectification into a vapor component and a liquid component.

The liquid component flows from auxiliary column G through pipe 26 into a part of main column F where the liquid component is subjected to an auxiliary rectification into a vapor product withdrawn through pipe 36 and a second liquid component which flows from auxiliary column K through pipe 60 into another part of main column F. This second liquid component is subjected to a second auxiliary rectification into a vapor product which is withdrawn through pipe 61 and a liquid product which accumulates around coil 44. The liquid product is vaporized to produce vapor reflux. Part of this vapor is withdrawn through pipe 45 as one of the products of rectification.

The vapor component of the main rectification flows from auxiliary column H through pipe 46 and then through pipe 49 into an upper part of main column F where the vapor component is subjected to an auxiliary rectification into a liquid product and a second vapor component. The liquid product is vaporized around tubes 51 and part is withdrawn through pipe 53 as one of the products of rectification. The second vapor component flows from auxiliary column L through pipe 66 and then through pipe 69 into the upper part of main column F where the second vapor component is subjected to a second auxiliary rectification into a vapor product withdrawn through pipe 55 as one of the products of rectification and a liquid product which is vaporized around tubes 63 and part withdrawn through pipe 65 as one of the products of rectification.

At the bottom of column F, a heating coil 44 is provided to produce vapor reflux. At the top of column F, a condenser with tubes 54 is provided to produce liquid reflux. Several heat exchangers are shown in Fig. 4 for producing vapor and liquid refluxes in the main and auxiliary rectifications to supplement the refluxes produced by heating coil 44 and condenser tubes 54.

Figure 5:
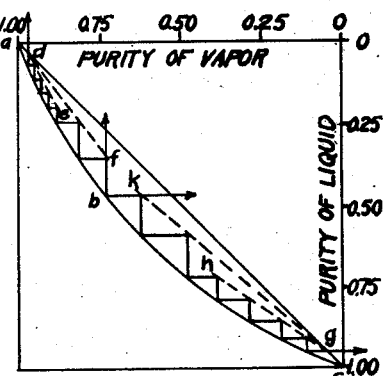
Figure 5 is a diagram to aid in explaining the heat exchange relations for producing refluxes in the several stages of rectification.

The locations of the heat exchangers in Figure 1 to Figure 4 will now be discussed by reference to Figure 5. Curve *a—b—c* shows the corresponding purities of liquid upon each tray of a rectifier and of vapor which comes into intimate contact therewith. Between trays, vapor is rising from the tray below and liquid is flowing down from the tray above. These vapor and liquid streams correspond to a certain heat, or energy, flow which must be the same from point to point along a rectifier except where heat is added or withdrawn by injection or withdrawal of fluids or by heat exchange between the fluid undergoing rectification and another fluid. Lines d—e, d—f, g—h and g—k show corresponding purities of vapor and liquid streams between trays for constant heat flows. Lines d—f and g—k represent larger heat flows than lines d—e and g—h respectively.

Lines b—f and b—k indicate the injection of vapor and liquid comprising the fluid mixture to be rectified. The composition of the vapor changes as it rises through the rectifier from tray to tray in accordance with a series of steps between curve a—b—c and line d—f until a change in heat flow occurs. The change in composition of the vapor then continues in accordance with another series of steps between curve a—b—c and a new line d—e corresponding to the new heat flow. Similarly, the composition of the liquid changes as it flows down from tray to tray within the rectifier in accordance with a series of steps between curve a—b—c and line g—k until a change in heat flow occurs. The change in composition of the liquid then continues in accordance with another series of steps between curve a—b—c and a new line g—h corresponding to the new heat flow.

A change from one heat flow to another heat flow occurs in the main rectification of the present invention where heat transfer means are located for producing reflux in the auxiliary rectifications. Thus, the change from heat flow line d—f to heat flow line d—e in Figure 5 occurs where tubes 51 are located in Figure 3 while the change from heat flow line g—k to heat flow line g—h in Figure 5 occurs where coil 33 is located in Figure 3.

The advantage of locating these heat transfer means as claimed becomes evident when we consider that the lengths of b—f and b—k determine the amount of rectification from tray to tray just above and just below the inlet to the main rectifier. If these lengths were zero (or negative), there would be no rectification of the entering fluid. The heat flows to produce rectification have certain minimum values corresponding to zero lengths of b—f and b—k. The heat flows must be above these minimum values in order to produce rectification near the inlet of the rectifier. The greater the heat flows, the greater will be the lengths of b—f and b—k and the more effective will be the rectification near the inlet to the rectifier.

At some distance from the inlet, however, a reduction of heat flow can be made without greatly affecting the rectification. Thus, heat flow line g—h, if extended, would pass through point b. Therefore, with heat flow line g—h there would be no rectification near the inlet. But by starting with heat flow line g—k at the inlet, there is considerable rectification before changing to heat flow line g—h when rectification will continue. More trays would, of course, be necessary to obtain the same purity of the liquid component of the main rectification when changing from heat flow line g—k to heat flow line g—h than if the heat flow corresponding to line g—k were available from the inlet for the fluid mixture to the outlet for the liquid component.

Heat flow line g—k corresponds to the vapor reflux that would be produced by heating coil 44 in Figure 3 with auxiliary rectifier G dormant. When a vapor product is withdrawn through pipe 36, however, the heat flow in main rectifier F is reduced to the line g—h below coil 33. Above coil 33, the heat flow remains along line g—k. If coil 39 were located at or above the inlet to the main rectifier, rectification therein would be adversely affected as explained. With heat flow line g—h passing through point b, rectification below the inlet would be stopped. If heat flow line g—h passed through at point between b and k, the effectiveness of the rectification below the inlet would be reduced in proportion.

The change from heat flow line g—k to heat flow line g—h may be due to heat exchanger 33 in Figure 3 producing liquid reflux for the auxiliary rectification of the liquid component of the main rectification or to heat exchanger 14 in Figure 4 for cooling the fluid mixture to be rectified. In the latter case, the nearer coil 14 is to inlet pipe 17, the farther point k is moved from point b for reasons previously explained. Therefore, the nearer coil 14 is to inlet pipe 17, the more effective will be the trays between coil 14 and the inlet in changing the composition of the liquid undergoing rectification.

In the operation of the invention, the apparatus is brought to operating temperatures by whatever means may be available. In separating atmospheric air, for example, the apparatus will quickly cool to low temperatures and liquids will accumulate due to the heat removed from the system by the expansion engine in performing mechanical work. As soon as operating temperatures and liquid levels are attained, the plant may be put into normal operation.

During normal operation of the apparatus in Figure 1 and Figure 2, valve 16 will be adjusted to maintain a constant liquid level in the bottom of preliminary rectifier D and valve 19 will be adjusted to maintain a constant liquid level in the bottom of exchanger E. Valve 8 will be adjusted to maintain a constant liquid level around tubes 27 and 28. Valve 25 may be adjusted to maintain a constant pressure at the top of main rectifier F. Valves 31 and 38 may be adjusted to maintain flows that will give desired purities of the several products.

If valve 38 should be closed, the auxiliary rectification will stop due to accumulation of nitrogen in the auxiliary rectifier above inlet pipe 26. The nitrogen will not condense in coil 33 or tubes 40 at the pressure and temperature existing in the auxiliary rectifier. Consequently, there will be no reflux liquid above the inlet to the auxiliary rectifier. The plant will then operate to rectify atmospheric air into two products instead of three products. The accumulation of nitrogen in the top of the auxiliary rectifier will be due to a small amount of nitrogen as an impurity in the impure oxygen liquid from the main rectifier.

For the apparatus in Figure 3 and Figure 4, the operation is essentially the same as for the apparatus in Figure 1 and Figure 2. During normal operation, pressures are maintained constant by the rate of withdrawal of one of the products of rectification, preferably the most volatile product. The rates of withdrawal of the other products are then regulated in accordance with the purities desired. If the withdrawal of any one product is stopped, the rectifier producing that product will not function. The purities of the other products will be affected. During normal operation, conditions can be changed in accordance with any variation in composition of the fluid mixture rectified by varying the rates of withdrawal of the products in accordance with the purities desired.

I claim:

1. Method of separating a fluid mixture which includes subjecting the fluid mixture to a main rectification into a vapor component and a liquid component, subjecting one component to an auxiliary rectification into a vapor product and a liquid product, withdrawing one product of the auxiliary rectification and subjecting it to heat exchange with fluid of the opposite phase undergoing the main rectification whereby a portion of the product withdrawn is changed in phase, and returning said portion to the auxiliary rectification to serve as reflux fluid therein.

2. Method of separating a fluid mixture as in claim 1 wherein reflux in the rectification is produced by heat exchange between the reflux fluid and the fluid mixture before rectification.

3. Method of separating a fluid mixture as in claim 1 wherein reflux in the rectification is produced by heat exchange between the reflux fluid and a product of the rectification.

4. Method of separating a fluid mixture as in claim 1 wherein a product of the auxiliary rectification is further rectified into a vapor product and a liquid product and reflux for the further rectification is produced by heat exchange between a product of the further rectification and fluid undergoing the auxiliary rectification.

5. Method of separating a fluid mixture which includes subjecting the fluid mixture to a main rectification into a vapor component and a liquid component, subjecting the vapor component to an auxiliary rectification into a first vapor product and a first liquid product, producing vapor reflux for the auxiliary rectification of the vapor component by heat exchange between said first liquid product and fluid while undergoing the main rectification, subjecting the liquid component to an auxiliary rectification into a second vapor product and a second liquid product, producing liquid reflux for the auxiliary rectification of the liquid component by heat exchange between said second vapor product and fluid while undergoing the main rectification, abstracting heat from said first vapor product to produce liquid refluxes in the rectification, and adding heat to said second liquid product to produce vapor refluxes in the rectification.

6. Method of separating a fluid mixture which includes subjecting the fluid mixture to a main rectification into a vapor component and a liquid component, subjecting the liquid component to an auxiliary rectification into a vapor product and a liquid product, producing liquid reflux for the auxiliary rectification of the liquid component by heat exchange between said vapor product and fluid while undergoing the main rectification.

7. Method of separating atmospheric air which includes subjecting the atmospheric air to a preliminary rectification into nearly pure nitrogen vapor and oxygen-rich liquid, subjecting the oxygen-rich liquid to a main rectification into nearly pure nitrogen vapor and impure oxygen liquid containing argon, subjecting the impure oxygen liquid to an auxiliary rectification into argon-rich vapor and nearly pure oxygen liquid, producing liquid reflux for the preliminary and main rectifications and vapor reflux for the auxiliary and main rectifications by heat exchange between nearly pure nitrogen vapor from the preliminary rectification and nearly pure oxygen liquid from the auxiliary rectification, and producing liquid reflux for the auxiliary rectification by heat exchange between argon-rich vapor from the auxiliary rectification and oxygen-rich liquid in the main rectification, said heat exchange occurring between the initial rectification of the oxygen-rich liquid and the withdrawal of the impure oxygen liquid.

8. Method of separating atmospheric air as in claim 7 which includes augmenting the vapor reflux in the main rectification of the oxygen-rich liquid by cooling the oxygen-rich liquid before rectifying it.

9. Method of separating atmospheric air as in claim 7 which includes augmenting the vapor reflux in the auxiliary rectification of the impure oxygen liquid by cooling the oxygen-rich liquid before rectifying it.

10. Method of separating atmospheric air as in claim 7 which includes augmenting the liquid reflux in the main rectification of the oxygen-rich liquid by warming nearly pure nitrogen vapor from the main rectification.

11. Apparatus for separating a fluid mixture which includes a rectifier for subjecting the fluid mixture to a main rectification into a vapor component and a liquid component, an inlet for the fluid mixture, outlets for the components, a second rectifier for subjecting one component to an auxiliary rectification into a vapor product and a liquid product, heat transfer means located within the first rectifier between the inlet for the fluid mixture and the outlet for the component subjected to the auxiliary rectification, means for withdrawing a product of the auxiliary rectification from the second rectifier and for admitting this product to said heat transfer means where a portion of said product is changed in phase by heat transfer with the fluid undergoing the main rectification, and means for returning said portion to the second rectifier to serve as a reflux fluid in the auxiliary rectification.

12. Apparatus for separating a fluid mixture which includes a rectifier for subjecting the fluid mixture to a main rectification into a vapor component and a liquid component, an inlet for the fluid mixture, outlets for the components, a second rectifier for subjecting the liquid component to an auxiliary rectification into a vapor product and a liquid product, heat transfer means located within the first rectifier between the inlet for the fluid mixture and the outlet for the liquid product and immersed in liquid undergoing rectification, means for conveying vapor from the second rectifier to said heat transfer means where the vapor is partly liquefied, means for returning the liquefied vapor to the second rectifier as a liquid reflux and means for withdrawing the remaining vapor as one of the products of rectification.

13. Apparatus for separating a fluid mixture which includes a rectifier for subjecting the fluid mixture to a main rectification into a vapor component and a liquid component, an inlet for the fluid mixture, outlets for the components, a second rectifier for subjecting the vapor component to an auxiliary rectification into a vapor product and a liquid product, heat transfer means located within the first rectifier between the inlet for the fluid mixture and the outlet for the vapor component and in contact with vapor undergoing rectification, means for conveying liquid from the second rectifier to said heat transfer means where the liquid is vaporized, means for returning part of the vaporized liquid to the second rectifier as a vapor reflux, and means for withdrawing part of the vaporized liquid as one of the products of rectification.

14. Apparatus for separating a fluid mixture as in claim 13 wherein are provided heat transfer means located within the second rectifier in contact with liquid undergoing rectification, means for conveying vapor from the first rectifier to said heat transfer means where the vapor is partly liquefied, means for returning the liquefied part to the first rectifier as a reflux liquid, and means for discharging the remaining vapor part into the second rectifier.

15. Apparatus for separating atmospheric air which includes a preliminary rectifier for rectifying the atmospheric air into nearly pure nitrogen vapor and oxygen-rich liquid, a condenser for liquefying the nearly pure nitrogen vapor, a main rectifier for rectifying the oxygen-rich liquid with the nearly pure nitrogen liquid as a liquid reflux into nearly pure nitrogen vapor and impure oxygen liquid containing argon, an inlet for the oxygen-rich liquid, an auxiliary rectifier for rectifying the impure oxygen liquid into nearly pure oxygen liquid and argon-rich vapor, heat transfer means for producing liquid reflux in the preliminary rectifier and vapor reflux in the auxiliary and main rectifiers by heat exchange between nearly pure nitrogen vapor from the preliminary rectifier and nearly pure oxygen liquid from the auxiliary rectifier, and heat transfer means for producing liquid reflux in the auxiliary rectifier by heat exchange between argon-rich vapor from the auxiliary rectifier and liquid undergoing the main rectification.

16. Apparatus for separating atmospheric air which includes a preliminary rectifier for rectifying the atmospheric air into nearly pure nitrogen vapor and oxygen-rich liquid, a condenser for liquefying the nearly pure nitrogen vapor, a main rectifier for rectifying the oxygen-rich liquid with the nearly pure nitrogen liquid as a liquid reflux into nearly pure nitrogen vapor and impure oxygen liquid, heat transfer means for producing vapor reflux in the main rectifier by heat exchange between impure oxygen liquid in the main rectifier and the oxygen-rich liquid before admitting it to the main rectifier, and means for reducing the impurity of the impure oxygen liquid before withdrawing it from the apparatus.

17. Apparatus for separating a fluid mixture which includes a rectifier for rectifying the fluid mixture into a vapor component and a liquid component, an inlet for the fluid mixture, outlets for the components, heat transfer means between the inlet for the fluid mixture and the outlet for the liquid component whereby vapor reflux near the inlet is produced by heat exchange between liquid undergoing rectification and the fluid mixture before admitting it to the rectifier, and means for continuing the rectification of the liquid between said heat transfer means and the outlet for the liquid component.

WILLIAM LANE DE BAUFRE.